(12) United States Patent
Vandevoorde et al.

(10) Patent No.: US 6,429,256 B1
(45) Date of Patent: Aug. 6, 2002

(54) AQUEOUS COATING COMPOSITION AND A POLYOL FOR SUCH A COMPOSITION

(75) Inventors: Paul Marie Vandevoorde, Essen (BE); Egbert Brinkman, Breda (NL); Rob Adriaan Otte, Nieuwdorp (NL); Robert Van Egmond, Bergem Op Zoom (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/887,393

(22) Filed: Jun. 22, 2001

Related U.S. Application Data

(63) Continuation of application No. PCT/EP99/10449, filed on Dec. 21, 1999.

(30) Foreign Application Priority Data

Dec. 24, 1998 (EP) .............................. 98204398

(51) Int. Cl.$^7$ .............................. C08J 3/00; C08K 3/20; C08L 75/00; C08F 12/30; C08F 28/02

(52) U.S. Cl. ................... 524/591; 524/507; 524/817; 524/839; 524/840; 525/123; 525/126; 525/266; 525/291; 525/440; 525/454; 525/455; 525/535; 525/536; 526/287; 528/364

(58) Field of Search ................ 524/591, 839, 524/840, 507, 817; 525/123, 126, 266, 291, 440, 454, 455, 535, 536; 528/364; 526/287

(56) References Cited

U.S. PATENT DOCUMENTS

| | | | |
|---|---|---|---|
| 5,075,370 A | 12/1991 | Kubitza et al. | 524/591 |
| 5,331,039 A | 7/1994 | Blum et al. | 524/507 |
| 5,344,873 A | 9/1994 | Blum | 524/591 |
| 5,716,676 A | 2/1998 | Schütze et al. | 427/385.5 |
| 5,747,166 A | 5/1998 | Schwarte et al. | 428/423.1 |
| 5,834,555 A | 11/1998 | Meisenburg et al. | 524/591 |

FOREIGN PATENT DOCUMENTS

| | | | |
|---|---|---|---|
| CA | CA 2090144 | 8/1993 | ......... C09D/175/04 |
| EP | 557 844 | 9/1993 | ........... C08G/18/70 |
| EP | 722 813 | 7/1996 | ............ B27K/5/00 |
| EP | 722813 A2 * | 7/1996 | |
| GB | 654 055 | 2/1994 | |
| WO | WO 94/03516 | 2/1994 | ........... C08G/18/62 |
| WO | WO 96/07540 | 3/1996 | ........... B32B/15/08 |
| WO | WO 97/19118 | 8/1997 | ......... C08F/291/00 |

OTHER PUBLICATIONS

Derwent No. 009580792 (1993), abstracting EP 557844.
Derwent Abstract 009770038 (1994), abstracting WO 94/03516.
Abstract of WO 94/03516 from EPO on-line data base esp@cenet.
Harakawa, H. et al., "The rheological properties of an aqueous acrylic dispersion suitable for automotive waterborne basecoats", Progress in Organic Coatings, vol. 34, 1998, p. 84–90.
International Search Report PCT/EP 99/10449.

* cited by examiner

*Primary Examiner*—Patrick D. Niland
(74) *Attorney, Agent, or Firm*—Lainie E. Parker

(57) ABSTRACT

Aqueous coating composition, for example for use as a clear or pigmented top coat or a primer, comprising:
  a) a polyol or a mixture of polyols having at least two hydroxy groups per molecule and:
   i a content C of carboxylate- and/or carboxylic acid-functional groups and
   ii a content S of sulfonate- and/or sulfonic acid-functional groups, and
  b) one or more cross-linkers capable of reacting with hydroxy groups.

A Polyol having a content C of carboxylate- and/or carboxylic acid-functional groups and a content S of sulfonate- and/or sulfonic acid-functional groups, the total content C+S being between 0.09 and 0.6 mmol/gram polyol, and the ratio C/S having a value between 0.5 to 20 and a process for preparing the polyol resin.

18 Claims, No Drawings

AQUEOUS COATING COMPOSITION AND A POLYOL FOR SUCH A COMPOSITION

This application is a continuation of PCT/EP99/10449, filed Dec. 21, 1999, which claims priority of European Patent Application No. 98204398.6, filed Dec. 24, 1998.

FIELD OF THE INVENTION

The invention relates to an aqueous coating composition comprising:
- a) a polyol or a mixture of polyols having at least two hydroxy groups per molecule and:
  - i a content C of carboxylate- and/or carboxylic acid-functional groups and
  - ii a content S of sulfonate- and/or sulfonic acid-functional groups, and
- b) one or more cross-linkers capable of reacting with hydroxy groups.

The invention also relates to a polyol which is particularly suitable for use in such a composition, the polyol having carboxylate- and/or carboxylic acid-functional groups with a content C and sulfonate- and/or sulfonic acid-functional groups with a content S. In this respect, carboxylate groups are defined as neutralized carboxylic acid groups and sulfonate groups are defined as neutralized sulfonic acid groups.

BACKGROUND OF THE INVENTION

European patent EP-B 0 537 568 discloses an aqueous composition comprising a dispersion of a polyol consisting of a polyester resin containing sulfonate groups and, optionally, carboxylate group in specified amounts. The sulfonate- and carboxylate-functional groups serve to make the polyol soluble in water. However, in the disclosed polyester polyol, the carboxylate groups, if present at all, play a minor role. In the disclosed polyester resins, the sulfonate groups are dominant. This has as a result that the initial curing is very slow.

The article "The rheological properties of an aqueous acrylic dispersion suitable for automotive waterborne basecoats" by Hiromi Harakawa c.s. in *Progress in Organic Coatings* 34, 1998, pages 84–90, discloses some coating compositions which are specifically designed for use as a metallic base coat for the automotive industry. After application, such a base coat is generally overcoated with a transparent top coat. One of the disclosed compositions in this publication comprises a sulfonate- and carboxylate-functional polyol, as well as an internally cross-linked latex, and a melamine formaldehyde curing resin. The internally cross-linked latex gives the coating composition a suitable structure to fixate the orientation of aluminium flakes during curing. This hinders the flow of the coating composition, which makes it unsuitable for other purposes, such as use as a top coat where excellent levelling, smoothness, and gloss are required. The polyol comprising the sulfonate and carboxylate groups has a high acid number of 40 mg KOH/g resin (ca. 0.72 mmol/g resin). As a result of the high acid content, such a coating shows a very low humidity resistance.

PCT patent application WO 94/03516 discloses an aqueous coating composition comprising carboxylate-functional polyols which are neutralized with amines. A major drawback to such compositions is that hydrophobic polyisocyanates cannot be stirred into the polyol component by hand. Polyisocyanates rendered hydrophilic by built-in polyethylene oxide segments are easily stirred in by hand, but combined with a carboxylate and/or carboxylic acid stabilized polyol and neutralizing amines, they do not lead to the formation of coating films of sufficient humidity resistance. Another drawback to coatings comprising polyols with carboxylate and/or carboxylic groups is their tendency to form surface defects, especially with thick layers, such as gas bubbles, pinholes, and craters. This is a result of the reaction of carboxylate and/or carboxylic acid groups with isocyanate groups, which produces amide linkage and formation of $CO_2$. Furthermore, unlike in the case of solvent-borne compositions, an acceptable balance of long potlife and fast curing is very difficult to achieve.

An aqueous system comprising polyols with sulfonate groups is disclosed in PCT patent application WO 97/19118. It was found that in the case of aqueous emulsions of acrylic polyol stabilized solely with sulfonate groups, the formation of gas bubbles and pinholes is largely reduced, even with thick layers. The potlife of such coating compositions is long and the films show a good resistance to solvents and humidity. However, curing is slow and the film smoothness is significantly lower than for solvent-borne systems.

German Offenlegungschrift DE-A 44 10 557 discloses an aqueous two-component coating composition comprising a polyol having carboxylate and/or sulfonate groups. Similar compositions are also disclosed by the European patent applications EP-A 0 358 979 and EP-A 0 557 844. None of these publications, however, discloses specific ratios of the carbonate and sulfonate groups.

The object of the invention is a stable aqueous coating composition which shows good flow properties directly after application in combination with faster and better curing in comparison with the known systems stabilized by carboxylate or sulfonate.

SUMMARY OF THE INVENTION

This object of the invention is achieved with an aqueous coating composition comprising:
- a) a polyol or a mixture of polyols having at least two hydroxy groups per molecule and:
  - i a content C of carboxylate- and/or carboxylic acid-functional groups and
  - ii a content S of sulfonate- and/or sulfonic acid-functional groups, and
- b) one or more cross-linkers capable of reacting with hydroxy groups.

DETAILED DESCRIPTION OF THE INVENTION

When, in the inventive aqueous coating composition, the total content of the sulfonate and/or sulfonic acid and carboxylate and/or carboxylic acid groups C+S is between 0.09 and 0.6 mmol/gram polyol, and the ratio C/S has a value between 0.5 to 20, these measures result in a somewhat delayed curing, so the paint can still flow directly after application. This gives an exceptionally good and smooth film appearance, also in thick layers. Levelling is excellent, and no surface defects, such as gas bubbles, pinholes or craters, occur. Formed films show a high gloss, excellent clarity, good hardness, and good chemical resistance, e.g., to solvents or gasoline. Moreover, coating compositions according to the current invention are colloidally stable aqueous compositions which provide high-quality coatings of high aesthetic quality without sacrificing technical characteristics, such as hardness, solvent resistance, and water resistance. The potlife and curing rate are easily controllable by the addition of catalysts.

The preferred combination of carboxylate and/or carboxylic acid and sulfonate and/or sulfonic acid groups depends on the intended use. If fast curing is required and the film's appearance is of less importance, the carboxylate and/or carboxylic acid content should be chosen higher. If, on the other hand, the film's appearance and a good hardness are more important than fast curing, the sulfonate and/or sulfonic acid content may be raised.

Particularly satisfying balances between film appearance and curing speed are found when the ratio C/S is within the preferred range between 0.5 and 10 or, more preferably, between 1 and 5. Optimum results are obtained if the ratio C/S is between 1.5 and 3.

Preferably, the total acid content of the carboxylate and/or carboxylic acid groups and the sulfonate and/or sulfonic acid groups C+S is between 0.18 and 0.6 mmol/gram of polyol. Optimum results are obtained if the total acid content C+S is between 0.18 and 0.36 mmol/gram of polyol.

Preferably, the polyols or polyol mixture has a hydroxy value between 50 and 300 mg KOH/gram polyol, more preferably between 50 and 200 mg KOH/gram polyol. Most preferably, the hydroxy value is between 75 and 200 mg KOH/gram polyol. The polyols have two or more hydroxy groups per molecule, preferably three or more.

The object of the invention can advantageously be achieved with a polyol having a content C of carboxylate- and/or carboxylic acid-functional groups and a content S of sulfonate- and/or sulfonic acid-functional groups, the total content C+S of the sulfonate and/or sulfonic acid and carboxylate and/or carboxylic acid groups being between 0.09 and 0.6 mmol/gram solid polyol, preferably between 0.18 and 0.36 mmol/gram of polyol, and the ratio C/S having a value between 0.5 to 20, preferably between 1.5 to 3. With such a polyol, a composition according to the invention can be made having all acid-functional groups on the same resin. Alternatively, only a portion of the polyols in the composition are polyols comprising carboxylate- and/or carboxylic acid-functional groups as well as sulfonate- and/or sulfonic acid-functional groups.

Alternatively, or additionally, the carboxylate and/or carboxylic groups and the sulfonate and/or sulfonic acid groups may at least partly be present on separate resins. In that case, the composition may comprise a mixture of a first emulsion or dispersion of polyols with carboxylate- and/or carboxylic acid-functional groups, and a second emulsion or dispersion of polyols with sulfonate- and/or sulfonic acid-functional groups. Alternatively, or additionally, the composition comprises an emulsion or dispersion of a mixture of polyols comprising carboxylate- and/or carboxylic acid-functional groups and polyols comprising sulfonate- and/or sulfonic-acid functional groups.

In a preferred embodiment of the coating composition according to the invention, more than 50% of the sulfonic acid groups and carboxylic acid groups is neutralized with a base, which preferably is volatile. Advantageously, the neutralizing agent is ammonia and/or an amine. Tertiary amines are preferred. Examples of suitable tertiary amines include trimethyl amine, triethyl amine, triisopropyl amine, triisopropanol amine, N,N-dimethyl ethanol amine, dimethyl isopropyl amine, N,N-diethyl ethanol amine, 1-dimethyl amino-2-propanol, 3-dimethyl amino-1-propanol, 2-dimethyl amino-2-methyl-1-propanol, N-methyl diethanol amine, N-ethyl diethanolamine, N-butyl diethanolamine, N-ethyl morpholine. Suitable primary amines are, for example, isopropyl amine, butyl amine, ethanol amine, 3-amino-1-propanol, 1-amino-2-propanol, 2-amino-2-methyl-1-propanol or 2-amino-2-methyl-1,3-propane diol. Secondary amines that can be used are, for example, morpholine, diethyl amine, dibutyl amine, N-methyl ethanol amine, diethanol amine, or diisopropanol amine. Alternatively, alkali metal hydroxides such as sodium hydroxide or potassium hydroxide can be used as neutralizing agents. Neutralization can be carried out prior to, during or after polymerization.

Advantageously, the polyol or polyols comprising sulfonate- and/or sulfonic acid- and/or carboxylate- and/or carboxylic acid-functional groups is also a polyacrylate. Alternatively, the polyol or polyols comprising the carboxylate- and/or carboxylic acid-functional groups and/or the sulfonic acid- and/or sulfonate-functional groups may be a resin, such as polyesters, polyesterurethanes, polyethers, polyurethanes, or acrylated hybrids thereof.

Examples of suitable ethylenically unsaturated hydroxy-functional monomers that can be used for the preparation of an acrylic polyol for a coating composition according to the invention are acrylates and methacrylates, such as 2-hydroxybutyl (meth)acrylate, 3-hydroxybutyl (meth)acrylate, or, preferably, 2-hydroxyethyl (meth)acrylate, 2-hydroxypropyl (meth)acrylate, 3-hydroxypropyl (meth)acrylate or 4-hydroxybutyl (meth)acrylate. A further group of preferred hydroxy-functional monomers are the reaction products of hydroxylated (meth)acrylates comprising lactone, for example, the reaction product of 2-hydroxyethyl acrylate with $\epsilon$-caprolactone. The (meth)acrylates of branched 1,3 diols represent a further class of preferred hydroxy-functional ethylenically unsaturated monomers, for example, the (meth)acrylates of 2,2,4-trimethyl-1,3-pentane diol, 2,2-dimethyl propane-1,3-diol, 2-ethyl hexane-1,3-diol, 2-methyl propane-1,3-diol. Further examples of suitable hydroxy-functional unsaturated monomers are hydroxyalkyl esters of additional ethylenically unsaturated acids such as maleic acid, fumaric acid, $\beta$-carboxyethyl acrylate, ethacrylic acid, itaconic acid, crotonic acid, citraconic acid, and the like. Specific examples of such hydroxy-functional monomers include 2-hydroxyethyl butyl maleate, bis-(2 hydroxyethyl)maleate, bis-(2-hydroxyethyl)fumarate, ethoxylated $\beta$-carboxyethyl acrylate, and propoxylated $\beta$-carboxyethyl acrylate.

Carboxylic or carboxylate groups are conveniently introduced by the copolymerization of ethylenically unsaturated monomers having carboxylic groups. Examples of such carboxylic acid- or carboxylate-functional monomers are (meth)acrylic acid, ethacrylic acid, β-carboxyethyl acrylate, crotonic acid, maleic acid, fumaric acid, itaconic acid, citraconic acid, monoalkyl esters of unsaturated dibasic acids, such as maleic acid, itaconic acid, or citraconic acid.

An alternative method for introducing carboxylic groups into an acrylic polymer includes the copolymerization of the reaction products of unsaturated hydroxy-functional monomers, for example, hydroxyalkyl (meth)acrylates as listed above, with a polybasic acid, only a portion of the carboxylic groups being reacted. Preferred examples of such monomers include the monoesters formed by the reaction of 1 mole of a hydroxy-functional monomer with 1 mole of a dibasic acid or its anhydride containing more than 2 carbon atoms. Phthalic acid, maleic acid, succinic acid, hexahydrophthalic acid, tetrahydro-phthalic acid, methyl hexahydrophthalic acid, trimellitic acid, dodecenyl succinic acid, and the anhydrides of these acids are examples of preferred polybasic acid reagents. The reaction between the unsaturated hydroxy-functional monomer and polybasic acid may take place beforehand to form the described carboxyl-functional monomer. Alternatively, the reaction can be carried out conveniently during or even after the formation of the acrylic polymer. Also in the latter case, polymers having covalently linked carboxylic groups are obtained.

A further alternative method for covalently linking carboxylic groups to an acrylic polyol consists of producing graft copolymers wherein the acrylic polymer is grafted onto a radically co-polymerizable carboxyl-functional non-acrylic resin, for example, a polyester resin or a polyurethane resin. Grafting of an acrylic polymer onto a carboxyl-functional resin can be done by copolymerizing the carboxyl-functional resin with the unsaturated monomers of the acrylic polymer. In the case of a polyester, reactive unsaturated groups originating from co-condensed maleic acid or allylic compounds can be used to copolymerize with the acrylic polymer. If the carboxyl-functional groups are present on a polyurethane prepolymer, it is convenient to react polyisocyanates with appropriate polyols of which at least a portion provides the unsaturated groups that are required for grafting onto the acrylic resin.

The copolymerizable unsaturated groups include, for instance, (meth)acrylic and allylic functional groups.

Sulfonic or sulfonate groups can be covalently introduced into a polyol by copolymerization of olefinically unsaturated compounds comprising sulfonic acid and/or sulfonate groups. Examples of suitable monomers are monomers represented by the formula:

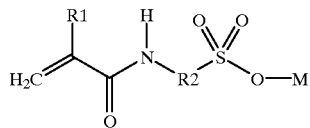

wherein R1 is a hydrogen, a C1 to C20 monovalent hydrocarbon radical or a halogen; R2 is a C1 to C20 divalent saturated hydrocarbon, optionally branched or substituted, and M is a hydrogen, alkali metal, ammonium or amine. Preferred sulfonic group-containing monomers are 2-acrylamido-2-methyl propane sulfonic acid and its amine or ammonium salts, preferably the salts obtained by neutralization with tertiary amines.

Other examples of suitable sulfonic acid- or sulfonate-functional unsaturated monomers include styrene sulfonic acid, ethylene sulfonic acid, 2-sulfoethyl methacrylate, and their salts. Alternatively, sulfonate groups can be introduced into acrylic polyols by reaction of alkali metal salts of taurine or adducts thereof with mono-epoxy compounds, e.g., the glycidyl ester of α-branched monocarboxylic acids, and epoxy-functional monomers, e.g., glycidyl methacrylate, prior to, during or after the formation of the acrylic polyol. Similarly, alkali metal salts of 3-cyclohexylamino-1-propane sulfonic acid can be introduced.

Other examples of copolymerizable unsaturated compounds suitable for the covalent introduction of sulfonic acid or sulfonate groups into acrylic polyols are the reaction products of free radical-polymerizable monomers comprising an isocyanate group and sulfonic acids or sulfonates comprising at least one isocyanate reactive group. Examples of such free radical-polymerizable monomers are α,α-dimethyl m-isopropenyl benzyl isocyanate and isocyanato-ethyl methacrylate. Examples of suitable sulfonic acids or sulfonates comprising at least one isocyanate reactive group are 2-hydroxyethyl sulfonic acid and its salts, alkali metal taurinates, alkali metal N-alkyl taurinates, and the reaction products of mono-epoxy compounds with alkali metal taurinates, 3-cyclohexylamino-1-propane sulfonic acid, and its alkali metal salts.

In addition to hydroxy- and acid-functional monomers, preferably at least one ethylenically unsaturated monomer that does not comprise hydroxy- or acid-functional groups is used for the preparation of the acrylic polyol. Suitable examples of such monomers are esters of acrylic or methacrylic acid having 1 to 18 carbon atoms, preferably 1 to 12 carbon atoms in the alcohol part, such as methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, hexyl (meth)acrylate, cyclohexyl (meth)acrylate, n-octyl (meth)acrylate, n-decyl (meth)acrylate, isodecyl (meth)acrylate, lauryl (meth)acrylate, 2-ethylhexyl (meth)acrylate, 3,5,5-trimethylcyclohexyl (meth)acrylate, t-butyl cyclohexyl (meth)acrylate, isobornyl (meth)acrylate, stearyl (meth)acrylate, (meth)acrylates with ether groups such as 2-methoxy ethyl (meth)acrylate, 2-ethoxy ethyl (meth)acrylate, and 3-methoxy-propyl (meth)acrylate; others such as dimethyl aminoethyl methacrylate, glycidyl (meth)acrylate, 2-acetoacetoxyethyl methacrylate, and 3-(trimethoxysilyl)-propyl methacrylate. Further suitable monomers are esters of β-carboxyethyl acrylate and crotonic acid having 1 to 18 carbon atoms in the alcohol part, and (cyclo)alkyl esters of unsaturated dicarboxylic acids with 1 to 12 carbon atoms in the (cyclo)alkyl groups such as diethyl maleate and dibutyl fumarate, di(cyclo)alkyl itaconates, and di(cyclo)alkyl citraconates.

Other olefinically unsaturated monomers suitable for the preparation of acrylic polyols include vinyl aromatic compounds such as styrene, α-methyl styrene, o-, m- or p-methyl styrene, and tert-butyl styrene; acrylamide, methacrylamide, acrylonitrile, N-alkoxy acrylamides, N-alkoxy methacrylamides; vinyl esters of C1–C18 monocarboxylic acids such as vinyl acetate, vinyl propionate, vinyl isobutyrate, vinyl esters of α-branched C5–C18 monocarboxylic acids, the vinyl esters of α-branched C9–C11 acids being preferred. Other suitable vinyl monomers include vinyl chloride, vinylidene chloride, vinyl pyrrolidone, and vinyl silanes such as vinyl trimethoxysilane and vinyl triethoxysilane.

The polyols in the composition according to the invention may advantageously comprise hydrophilic alkylene oxide groups. Ethylene oxide groups are preferred, but alternatively propylene oxide groups or mixtures of ethylene oxide and propylene oxide groups are useful as well. For example, acrylic polyols may comprise copolymerized units of esters of unsaturated acids and C1–C4 alkoxy ethers of polyalkylene glycols, such as (meth)acrylates with the structure:

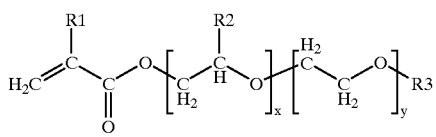

wherein R1 is a hydrogen or methyl group, R2 is an alkyl group with 1 to 4, preferably 1, carbon atoms; R3 is a hydrocarbon radical with 1 to 20, preferably 1 to 4, most preferably 1 or 2, carbon atoms; x is between 0 and 40, preferably between 0 and 20, most preferably between 0 and 10; y is between 0 and 50, and x+y is between 2 and 50, preferably between 2 and 25. Examples of preferred esters of (meth)acrylic acid and polyalkylene glycol monoethers are the (meth)acrylates of the methoxy ethers of polyethylene glycols or polypropylene glycols where the alcohol has a molecular weight between 200 and 2000, preferably between 200 and 1500, most preferably between 350 and 1000, The acrylic polyols of the invention may also contain minor amounts up to about 10% of polymerized units of polyunsaturated monomers such as allyl methacrylate, ethylene glycol dimethacrylate, hexanediol diacrylate, trimethylol propane triacrylate, and the like.

Suitable initiators for the preparation of the acrylic polymers are known in the art, such as di-tert butyl peroxide, tert. butyl peroxy benzoate, tert. butyl peroxy-2-ethylhexanoate, tert. butyl peroxy-3,5,5-trimethyl hexanoate, and the like and azo initiators such as 2,2-azo-bis(2-methylbutyronitrile) and 2,2-azo-bis(isobutyronitrile).

The molecular weight of the polymers can be controlled by chain regulators such as n-octyl mercaptan, n-dodecyl mercaptan, tert. dodecylmercaptan, mercaptoethanol, mercaptopropionic acid, or thioglycol.

Preferably, the preparation of the acrylic polymers is conducted in organic solution or by aqueous emulsion polymerization.

Organic solution polymerization generally includes charging an organic solvent, optionally together with a fraction of the monomers and/or initiator, followed by continuous feeding of the monomers and the initiator over a period of about 1 to 10 hours, usually 3 to 6 hours, at a reaction temperature of about 50 to 200° C., usually 120 to 180° C. To achieve a practically complete conversion of the monomers it is common practice to add an additional amount of initiator to the reaction mixture and to maintain the reaction temperature for some time, usually not more than two hours. The monomers can be added continuously as a single mixture. Alternatively, a portion of the monomers can be added at a slower or a faster rate, or the addition can be started earlier or later, or can be ended earlier or later.

A preferred process for preparing an acrylic polyol resin according to the invention comprises the following steps:
polymerizing a mixture of hydroxy-functional, olefinically unsaturated monomers without carboxylic acid- or sulfonic acid-functional groups and without carboxylate- or sulfonate-functional groups in a solvent-borne solution to obtain a hydrophobic polyol;
after a portion of the monomer mixture has polymerized, adding to it a mixture of said monomers with olefinically unsaturated monomers having hydroxy groups, carboxylic acid and/or carboxylate groups and/or sulfonic acid and/or sulfonate groups to obtain a hydrophilic polyol;
evaporating the solvent by raising the temperature;
dispersing the polyol in a mixture of water and amines.

Preferably, the monomers having carboxylic acid-functional and/or carboxylate-functional groups and/or sulfonic acid-functional or sulfonate groups are added after about 50–90 wt %, preferably 60–80 wt % of the monomers without carboxylic acid- or sulfonic acid-functional or carboxylate or sulfonate groups has been polymerized.

Accordingly, in this process the monomers are added in at least two stages. In the first stage a first portion of the non-acidic monomers is charged into a reactor and polymerized. Subsequently, a mixture of the acidic monomers and the remaining portion of the non-acidic monomers is added. It is particularly preferred to add about 50 to 90 wt %, preferably about 60 to 80 wt % by weight of the total monomer content in the first stage, in about 50 to 90%, preferably about 60 to 80% of the total monomer addition time, the acidic monomers being substantially excluded. Subsequently, the acidic monomers are added to the remaining non-acidic monomers, and the thus formed monomer mixture is continuously added in the remaining part of the total monomer addition time. Polymerization is continued until essentially all monomers have polymerized. This process results in core-shell particles having the acid-functional groups in the shell, where they are most useful.

Suitable solvents for the preparation of the acrylic polyols include aromatic hydrocarbons such as toluene, xylene or ethyl benzene; alcohols such as ethanol, isopropanol, n-butanol, 2-butanol, hexanol or benzyl alcohol; ketones such as methylethyl ketone, methylisobutyl ketone, methylamyl alcohol or ethylamyl ketone; esters such as butylacetate, butylpropionate, ethoxyethyl propionate, ethylglycol acetate, butylglycol acetate, methoxypropyl acetate; ethers such as 2-methoxypropanol, 2-methoxybutanol, ethylene glycol, monobutyl ether, propylene glycol monopropyl ether, propylene glycol monobutyl ether, dioxolane, or mixtures thereof.

The above volatile organic solvents may be replaced wholly or in part by one or more essentially non-volatile reactive diluents preferably containing one or more hydroxy groups, for example, a polyether polyol or polyester polyol comprising two or more hydroxy groups, and having a number average molecular weight below 1000 and a viscosity below 10 Pa.s.

Alternatively, the acrylic polyols according to the invention can be prepared directly in an aqueous medium by radical emulsion polymerization. A preferred method includes charging a reactor with water, optionally together with a portion of the initiators, a portion of the emulsifiers, and a portion of the monomers, heating to polymerization temperature, and then adding the rest of the monomers, initiators. and emulsifiers over a period of 1 to 10 hours, preferably 2 to 6 hours.

Suitable initiators include azo initiators, organic peroxides, and hydro-peroxides, hydrogen peroxide, persulfates such as sodium, potassium, and ammonium persulfate, optionally in combination with reducing agents such as ascorbic acid, sodium bisulfite, and sodium formaldehyde sulfoxylate. For control of the molecular weight chain regulators such as n-dodecyl mercaptan, tert. dodecyl mercaptan, n-octyl mercaptan, and thioglycol may be used.

Though the use of acrylic polyols is preferred, the aqueous polyol composition according to the invention may alternatively, or additionally, comprise polyester polyols containing carboxylic and/or sulfonic acid groups which are present in at least partially neutralized form. The polyesters can be prepared by the polyesterification of polycarboxylic acids, their anhydrides or dialkyl esters with polyalcohols. Optionally mono-functional acids, monoalcohols and/or hydroxy-functional acids and/or epoxy compounds may be used as co-reactants.

Examples of polycarboxylic acids or reactive derivatives thereof that can be used for the preparation of suitable polyester polyols are phthalic anhydride, isophthalic acid, terephthalic acid, hexahydrophthalic anhydride, 1,4-cyclohexane dicarboxylic acid dimethylester, dimethyl terephthalate, tetrahydrophthalic anhydride, maleic anhydride, succinic anhydride, adipic acid, dimeric acid, trimellitic anhydride, lithium, sodium, potassium or amine salts of 5-sulfoisophthalic acid, or dimethyl sulfoisophthalic acid, and mixtures thereof.

Examples of monocarboxylic acids that can be used for the preparation of suitable polyester polyols are benzoic acid, tert. butyl benzoic acid, sulfobenzoic acid, lithium, sodium, potassium or amine salts of sulfobenzoic acid, and saturated acids, for example, linear acids with 5–18 carbon atoms; isononanoic acid, 2-ethylhexanoic acid, pivalic acid, unsaturated acids such as soyabean fatty acids, dehydrated castor oil fatty acids, tall oil fatty acids, etc., and mixtures of these mono-carboxylic acids.

Examples of hydroxy-functional acids that can be used for the preparation of suitable polyester polyols are dimethylol propionic acid, hydroxypivalic acid, castor oil fatty acids, 12-hydroxystearic acid, 5-hydroxy-pentanoic acid or its lactone.

Examples of polyalcohols that can be used for the preparation of suitable polyester polyols are ethylene glycol, propylene glycol, neopentyl glycol, 2-butyl-2-ethyl-1,3-propane diol, 1,6-hexane diol, cyclohexane dimethanol, glycerol, trimethylol propane, trimethylol ethane, pentaerythritol, di-trimethylol propane, di-pentaerythritol, and mixtures thereof.

Examples of monoalcohols that can be used for the preparation of suitable polyester polyols are n-hexanol, cyclohexanol, tert. butyl cyclohexanol, benzyl alcohol, stearyl alcohol, dodecanol, and mixtures thereof.

Examples of epoxy-functional compounds are the glycidyl ester of α-branched monocarboxylic acids, epoxydized vegetable oils, polyglycidyl ethers of polyalcohols or polyphenols, and polyglycidyl esters of polycarboxylic acids.

The introduction of the carboxylic acid groups or carboxylate groups into the polyester polyols can be achieved by incomplete esterification of the carboxylic groups of the polycarboxylic and/or hydroxy-functional acid monomers.

Sulfonic acid groups and/or sulfonate groups can be introduced into the polyester polyols by co-condensation of carboxylic acids and/or alcohols comprising sulfonic acid groups and/or sulfonate-functional groups, for example, the lithium, sodium, potassium, and amine salts of 5-sulfoisophthalic acid, sulfobenzoic acid and 2-hydroxyethane sulfonic acid.

The polyester polyols according to the invention also can be modified, for example, with polyisocyanates to form urethanes. The modification reaction optionally is carried out in the presence of compounds comprising hydroxy and/or isocyanate reactive amine groups, for example, neopentyl glycol, 1,6-hexanediol, 2-butyl-2-ethyl-1,3-propane diol, 1,3-trimethylol propane, ethylene glycol, 2-ethylhexanol, benzyl alcohol, ethanolamine, N-methylethanolamine linear or branched polyester polyols, polyether polyols such as polyethylene glycols, polypropylene glycols, ethoxylated trimethylol propane, propoxylated pentaerythritol, monoalkyl ethers of polyethylene or polypropylene glycols, polyacrylic polyols, epoxy resins, and polyurethane polyols.

The polyols according to the invention that are based on polyesters can be modified by the copolymerization of olefinically unsaturated monomers such as styrene, alkyl acrylates, olefinically unsaturated monomers containing carboxylic acid, carboxylate, sulfonic acid, sulfonate-functional groups, and/or alkyl methacrylates, hydroxyalkyl acrylates, hydroxyalkyl methacrylates or glycidyl methacrylate to form polyester—acrylic hybrids. Both the polyester and the acrylic portions of the hybrid composition may comprise at least partially base neutralized carboxylic and/or sulfonic acid groups. Alternatively, all the carboxylic and/or sulfonic acid groups may be present in the polyester or the acrylic part of the hybrid composition Alternatively, or additionally, the composition according to the invention may comprise one or more polyurethane polyols comprising at least partially neutralized carboxylic and/or sulfonic acid groups.

Suitable polyether polyols are the reaction products of polyalcohols, for example, ethylene glycol, trimethylol propane, glycerol, pentaerythritol, sorbitol, and the like, with alkylene oxides such as ethylene oxide, propylene oxide or butylene oxide or mixtures of alkylene oxides.

Suitable polyurethane polyols can be made, for example, by reacting an aliphatic, alicyclic or aromatic di- or triisocyanate, one or more polyalcohols containing 2 to 6 hydroxy groups and having a number average molecular weight up to 600, a polyether or polyester diol having a number average molecular weight between about 400 and about 3000, a mono- or dihydroxy carboxylic acid or carboxylate and/or a mono- or difunctional alcohol comprising a sulfonic acid group or sulfonate group or a mono- or diamine comprising a sulfonic acid group or sulfonate group.

Carboxylic acid groups can be introduced into the polyurethane by the co-reaction of hydroxy carboxylic acids. Dimethylol propionic acid, hydroxypivalic acid, and hydroxystearic acid are preferred.

A polyol, for example an acrylic polyol, may be grafted to the polyurethane polyols containing carboxylic acid or carboxylate groups and/or sulfonic acid or sulfonate groups. The grafting site in the polyurethane component can be provided by a co-reacted unsaturated monomer, for example, an acryloyl-functional hydroxy compound such as hydroxyethyl acrylate, hydroxybutyl acrylate, an allyl-functional hydroxy compound such as trimethylol propane diallyl ether. In the urethane-acrylic graft polymer the carboxylic and/or sulfonic groups can be present in both polymer components. Alternatively, all acid groups or their neutralized derivatives can be present in either the polyurethane part or the acrylic part.

Sulfonate groups or sulfonic acid groups can be introduced into a polyurethane polyol, for example, by co-reaction with isocyanates and with hydroxy- or amine-functional compounds comprising at least one sulfonic acid group or sulfonate group, for example, 2-hydroxethane sulfonic acid, the sodium salt of 2-aminoethane sulfonic acid, 3-cyclohexylamino-1-propane sulfonic acid, the reaction product of sodium 5-sulfoisophthalate with an equivalent excess of diols, triols or epoxy compounds, in which case the reaction product may contain reacted units of polycarboxylic acids such as adipic acid, phthalic acid, isophthalic acid, hexahydrophthalic anhydride, trimellitic anhydride, etc.

The polyester or polyurethane polyol based compositions according to the invention preferably contain organic solvent for reduction of the viscosity. Suitable solvents are aromatic hydrocarbons such as toluene and xylene; alcohols such as ethanol, isopropanol, n-butanol, 2-butanol, hexanol, benzyl alcohol, and ketones such as methylethyl ketone, methylisobutyl ketone, methylamyl ketone, and ethylamyl ketone; esters, such as butyl acetate, butyl propionate, ethoxyethyl propionate, ethylglycol acetate, butylglycol acetate, and methoxypropyl acetate; ethers such as 2-methoxypropanol, 2-methoxybutanol, ethylene glycol monobutyl ether, propylene glycol monopropyl ether, propylene glycol monobutyl ether, dioxolane or mixtures thereof. Other suitable solvents are N-methyl-2-pyrrolidone, dimethyl carbonate, propylene carbonate, butyrolactone, caprolactone, etc.

Mixing the, optionally acrylically modified, polyester and polyurethane polyols with an aqueous medium can be done conveniently by adding water to the polyol solutions or, alternatively, by adding the polyol solutions to water, under agitation of the water and of the polyol solutions. The organic solvent content of the resulting emulsions or dispersions may be reduced by distillation, optionally under reduced pressure.

It is preferred that the content of volatile organic solvent in the final dispersion or emulsion does not exceed 10% by weight and, most preferably, does not exceed 5% by weight.

The coating compositions according to the invention comprise at least one cross-linking agent which is capable of reacting with at least two hydroxy groups. Examples of suitable cross-linking agents are amino resins such as melamine formaldehyde resins and carbamate resins, polyisocyanates, and blocked polyisocyanates. Examples of preferred melamine resins are partially and fully alkylated melamine formaldehyde condensates, for example, partially methylated melamine formaldehyde resins and hexamethoxymethyl melamine. Polyisocyanates are a preferred class of cross-linking agents normally used in a two-pack system which can be cured at temperatures between 0° C. and 120° C., usually between 20° C. and 80° C. Cross-linking agents based on blocked polyisocyanates can be used in one-pack systems and generally require higher curing temperatures, usually between 120° C. and 160° C.

Suitable polyisocyanate curing agents are, for instance, 1,6-diisocyanatohexane, isophorone diisocyanate, 2,4-toluene diisocyanate, 2,6-toluene diisocyanate, diphenyl methane-diisocyanate, 4,4'-bis(isocyanato-cyclohexyl) methane, 1,4-diisocyanatobutane, 1,5-diisocyanato-2,2-dimethyl pentane, 2,2,4-trimethyl-1,6-diisocyanatohexane, 1,10-diisocyanatodecane, 4,4-diisocyanato-cyclohexane, 2,4-hexahydrotoluene diisocyanate, 2,6-hexahydrotoluene diisocyanate, norbornane diisocyanate, 1,3-xylylene diisocyanate, 1,4-xylylene diisocyanate, 1-isocyanato-3-(isocyanato methyl)-1-methylcyclohexane, m-α,α-α',α'-tetramethylxylylene diisocyanate. Particularly preferred isocyanate curing agents are triisocyanates, for example, 1,8-diisocyanato-4-(isocyanatomethyl) octane, and adducts and oligomers of polyisocyanates, for instance, biurets, isocyanurates, allophanates, uretdiones, urethanes, and mixtures thereof. Examples of such oligomers and adducts are the adduct of 3 moles of toluene diisocyanate to 1 mole of trimethylol propane, the isocyanurate trimer of 1,6-diisocyanatohexane, the isocyanurate trimer of isophorone diisocyanate, the uretdion dimer of 1,6-diisocyanatohexane, the biuret trimer of 1,6-diisocyanatohexane, the allophanate-modified trimer or higher oligomers of 1,6-diisocyanatohexane, the adduct of 3 moles of m-α,α-α',α'-tetramethylxylene diisocyanate to 1 mole of trimethylol propane, and mixtures thereof.

The polyisocyanate curing agents may advantageously contain hydrophilic groups, for example, covalently bonded hydrophilic polyether moieties. Such polyisocyanates can be stirred in much more easily by hand than hydrophobic polyisocyanates. It was found that coating compositions according to the present invention that are cured by hydrophilized polyisocyanates can lead to the formation of coating films of sufficient humidity resistance, unlike coatings comprising polyols that are solely stabilized by carboxylate and/or carboxylic acid groups and neutralizing amines.

Preferred polyether compounds for the modification of polyisocyanates are, for example, mono- and dihydric polyalkylene oxide polyether alcohols containing a statistical average of 3 to 25 ethylene oxide units. The hydrophilic polyisocyanates preferably have an isocyanate functionality of 1,5 to 5 and a content of ethylene oxide units within the bound polyether chains of about 2 to 20% by weight. Examples of preferred hydrophilic polyisocyanates are the reaction products of the isocyanurate trimers of 1,6-diisocyanatohexane and/or the isocyanurate trimers of isophorone diisocyanate and a methyl ether of polyethylene glycol; the reaction product of the adduct of m-α,α-α',α'-tetramethyl xylylene diisocyanate (3 moles) and trimethylol propane (1 mole) and a methyl ether of polyethylene glycol. Alternatively, the polyisocyanate may be rendered hydrophilic by reaction with isocyanate reactive compounds containing ionic groups, for example, the alkali metal salts of sulfonic acids containing at least one hydroxy group or one isocyanate reactive amine group.

Suitable blocked polyisocyanate curing agents for the formulation of heat curable coating compositions are, for example, reaction products of the above-listed adducts and oligomers with well-known blocking agents such as phenol, caprolactam, ketoximes, monoamines, etc.

The coating compositions according to the present invention can further comprise other components and additives, such as pigments, extenders, colouring agents, pigment dispersants, rheology-controlling agents, levelling agents, flatting agents, coalescents, biocides, plasticizers, UV absorbers, light stabilizers, accelerators, for example, tin catalysts, tertiary amines, p-toluene sulfonic acid, and blocked derivatives thereof. Other examples of suitable accelerators are organo-tin compounds, such as dimethyl tin dilaurate, dibutyl tin dilaurate, dioctyl tin dilaurate, or tin octoate.

The coating compositions can further comprise one or more reactive diluents, for example, polyester polyols, polyether polyols or polyester-ether polyols having a molecular weight below 1000 and containing at least two hydroxy groups, one or more other well-known coating resins, for example, epoxy resins, phenolic resins, cellulose nitrate, polyvinyl butyral resins, polyvinyl chloride copolymers, cellulose acetobutyrates, etc.

Coatings according to the present invention can be applied to various substrates, such as metal, wood, paper, cardboard, gypsum, concrete, plastic, etc., and may for example be used as clear coats or as pigmented top coats. Various known application methods can be used, such as brushing, spraying, rolling, dipping, printing, etc.

The coating compositions according to the present invention can be used advantageously in various application fields such as the coating and recoating of automobiles, trucks, buses, railway equipment, aircraft, ships, steel and concrete constructions, general industry applications. The coating compositions according to the invention are particularly suitable as clear and/or pigmented finishes and refinishes for automobiles, trucks, and buses. The coating compositions according to the invention are also suitable for use as fillers, primers, or base coats.

The invention is further described and illustrated by the following examples. In these examples the compositions listed below are used as indicated.

| | |
|---|---|
| AMPS ® | 2-acrylamido 2-methyl propane sulfonic acid, commercially available from Lubrizol Company; |
| Autobase ® | base coat, commercially available from Akzo Nobel Coatings; |
| Autosurfacer ® 940 | primer, commercially available from Akzo Nobel Coatings; |
| Bayhydur ® 3100 | curing agent consisting of the trimer of 1,6-diisocyanato hexane having polyethylene oxide groups, available from Bayer; |

-continued

| | |
|---|---|
| Bayhydur ® 2150 | curing agent consisting of the trimer of isophorone diisocyanate having polyethylene oxide groups, available from Bayer; |
| Byk ® 301 | levelling agent, available from Byk; |
| Byk ® 348 | " |
| Dehydran ® 1293 | anti-foaming agent, available from Henkel; |
| Proglyde ® DMM | dipropylene glycol dimethyl ether, solvent from Dow Chemical; |
| Surfonyl ® 104 | wetting agent, available from Air Products; |
| Tinstab ® BL277 | dibutyl tin dilaurate, used as a catalyst, available from Akcross Chemicals; |
| Trigonox ® 42S | initiator consisting of tert. butyl peroxy-3,5,5 trimethyl hexanoate, commercially available from Akzo Nobel Chemicals; |
| Viscalex ® HV30 | acrylic thickener, available from Allied Colloids. |

In the examples, the following abbreviations are used for the compounds as indicated.

| | |
|---|---|
| DMAE | 2-(dimethyl amino) ethanol; |
| MPEG (550)-MA | methacrylate comprising methoxy polyethylene glycol chain with a number average molecular weight Mn = 550, |
| MMA | methylmethacrylate |

In the examples, all amounts are given in parts by weight, pbw.

EXAMPLES 1 TO 4

Preparation of a Polyol Resin

Four polyols according to the invention are prepared according to the following method, in Examples 1–4, respectively. Amounts in pbw of the used contents are given in Table 1.

A reaction vessel equipped with an agitator, a condenser, a thermocouple, and a nitrogen inlet device is charged with butylglycol and heated to 140° C. under a nitrogen flow of 5 l per hour. Then a mixture of n-butylacrylate, styrene, methylmethacrylate, hydroxyethyl acrylate, lauryl methacrylate, MPEG (550)-methacrylate, and Trigonox® 42S is added continuously to the reactor at a rate of about 22 g/min. During the addition the temperature of the reactor content is maintained at 140° C. After a dosing time of 165 minutes, when about 75 wt. % of the monomer and the initiator has been added, the addition is stopped. In this first phase, a hydrophobic acrylic polymer without acid-functional groups is formed.

A preformed mixture of AMPS, DMAE, and butylglycol is mixed with acrylic acid. This mixture is then added to the remaining portion of the monomer and initiator mixture. The resulting mixture is homogenized. Subsequently, the mixture is fed to the reactor over a period of 75 minutes, the temperature in the reactor being held at 140° C. In this second phase acid-functional polymers are formed.

After completion of the monomer addition, the dosing equipment is rinsed with butylglycol, which is subsequently added to the reactor content. The reactor charge is held at 140° C. for 15 minutes. A solution of Trigonox® 42 S in butylglycol is then added in two equal portions with a time interval of 15 minutes. After the mixture has been held at 140° C. for another 30 minutes, the reactor content is cooled to room temperature.

According to this method, four polyols, referred to as Examples 1–4, respectively, were prepared, using the amounts as given in parts by weight (pbw) in the following Table 1.

TABLE 1

Components for polyols of Examples 1–4

| Examples: | 1 | 2 | 3 | 4 |
|---|---|---|---|---|
| Butyl glycol Premixed | 20.4 | 21.8 | 21.6 | 20.8 |
| n-butyl acrylate | 21.6 | 16.2 | 27.4 | 21.4 |
| Styrene | 14.3 | 14.2 | 14.0 | 13.9 |
| MMA | 6.8 | 15.2 | 11.0 | 7.5 |
| Hydroxy ethyl acrylate | 20.6 | 20.8 | 11.0 | 20.2 |
| Lauryl methacrylate | 2.1 | 2.1 | 2.1 | 2.1 |
| MPEG-550-MA | 2.3 |  | 2.3 | 2.2 |
| Trigonox ® 42S | 2.1 | 2.2 | 2.1 | 2.1 |
| Acrylic acid Premixed | 0.9 | 1.3 | 0.9 | 0.8 |
| AMPS | 1.6 | 1.1 | 1.2 | 1.3 |
| DMAE | 0.7 | 0.5 | 0.5 | 0.6 |
| Butyl glycol Solution | 2.7 | 1.8 | 2.1 | 2.7 |
| Butyl glycol | 1.8 | 0.6 | 1.7 | 1.9 |
| Trigonox ® 42S | 0.1 | 0.1 | 0.1 | 0.2 |
| Butyl glycol | 2.0 | 2.1 | 2.0 | 2.3 |

EXAMPLE 5
Preparation of a Polyol Resin

A fifth polyol according to the invention is made via an alternative method where the acid-functional monomers are added to the other monomers right from the start.

The same equipment is used as in Examples 1 to 4. A reaction vessel is charged with 21.7 pbw butyl glycol. The charge is heated to 140° C. under a nitrogen flow of 5 l per hour. Then a mixture of 7,8 pbw n-butyl acrylate, 21.0 pbw styrene, 14.1 pbw methyl methacrylate, 20.4 pbw hydroxyethyl acrylate, 2,1 pbw lauryl methacrylate, 2.3 pbw MPEG (550)-methacrylate, and 2.2 pbw Trigonox® 42S is added continuously to the reactor at a rate of 22 g/min, together with a mixture of 0.9 pbw acrylic acid and a premixture of 1.2 pbw AMPS, 0.5 pbw DMEA, and 1.6 pbw butylglycol. During the addition the temperature of the reactor content is maintained at 140° C. Subsequently, the dosing equipment is rinsed with 1.8 pbw butylglycol, which is then added to the reactor content. The reactor charge is held at 140° C. for 15 minutes. A solution of 0.14 pbw Trigonox® 42 S in 2.0 pbw butylglycol is then added in two equal portions with a time interval of 15 minutes. After the mixture is held at 140° C. for another 30 minutes, the reactor content is cooled to room temperature.

COMPARATIVE EXAMPLES 6 AND 7

Two comparative examples are given. Example 6 relates to a polyol comprising only sulfonic acid-functional groups. Example 7 relates to a polyol comprising only carboxylate-functional groups. Both polyols are prepared according to the same method as used in Examples 1–4. The amounts used are given in Table 2.

TABLE 2 components for polyols of Comparative Examples 6 and 7

| Examples: | 6 | 7 |
|---|---|---|
| Butyl glycol Premixed | 19.1 | 24.5 |
| n-butyl acrylate | 21.9 | 21.1 |
| Styrene | 14.0 | 14.1 |
| MMA | 6.7 | 8.4 |
| Hydroxy ethyl acrylate | 20.6 | 20.7 |
| Lauryl methacrylate | 2.1 | 2.1 |
| MPEG-550-MA | 2.3 | 2.3 |
| Trigonox ® 42S | 2.1 | 2.1 |
| Acrylic acid Premixed |  | 1.4 |
| AMPS | 2.5 |  |
| DMAE | 1.2 |  |
| Butyl glycol Solution | 3.6 |  |
| Butyl glycol | 1.8 | 1.1 |
| Trigonox ® 42S | 0.1 | 0.1 |
| Butyl glycol | 2.0 | 2.1 |

The polyols and their solutions, as prepared in Examples 1–5 and Comparative Examples 6 and 7 show the properties and characteristics listed in Table 3, The molecular weight Mw and the number average molecular weight Mn are determined utilizing gel permeation chromatography with polystyrene as the standard. Tg is the glass transition temperature, which is calculated by the Fox equation with an estimated value Tg=227° C. for AMPS® and an estimated value Tg=−31° C. for MPEG 550-MA.

TABLE 3 parameters of polyols of Examples 1–7

| | Examples | | | | | Comparative examples | |
|---|---|---|---|---|---|---|---|
| | 1 | 2 | 3 | 4 | 5 | 6 | 7 |
| Acrylic polyol parameters | | | | | | | |
| Carboxylic/carboxylate content C (mmol/gram) | 0.178 | 0.255 | 0.179 | 0.160 | 0.179 | 0 | 0.275 |
| Sulfonic/sulfonate content S (mmol/gram) | 0.110 | 0.075 | 0.083 | 0.090 | 0.083 | 0.172 | 0 |

TABLE 3-continued parameters of polyols of Examples 1–7

|  | Examples | | | | | Comparative examples | |
| --- | --- | --- | --- | --- | --- | --- | --- |
|  | 1 | 2 | 3 | 4 | 5 | 6 | 7 |
| Total content number C + S (mmol/gram) | 0.288 | 0.330 | 0.262 | 0.250 | 0.262 | 0.172 | 0.275 |
| Ratio C/S | 1.62 | 3.4 | 2.16 | 1.78 | 2.16 | 0 | — |
| Tg in ° C. | −3 | 12 | 27 | −3 | 27 | −3 | −3 |
| Hydroxyl number (mg KOH/gram) | 140 | 140 | 75 | 140 | 140 | 140 | 140 |
| Properties of acrylic resin solutions | | | | | | | |
| Solids content (after 1 hour at 125° C.) | 72.0 | 72.1 | 71.6 | 70.7 | 72.2 | 72.7 | 71.5 |
| Viscosity (Pa · s at 23° C.) | 26.5 | 57 | 11.6 | 17.7 | 124 | 27.4 | 18.1 |
| Color (HAZEN) | 230 | 138 | 77 | 192 | 56 | 240 | 20 |
| Molecular weight Mn | 5100 | 5200 | 5300 | 5700 | 5400 | 6700 | 6400 |
| Mw | 23400 | 16800 | 17000 | 18600 | 18200 | 25800 | 15200 |

EXAMPLES 1–7

Preparation of Aqueous Polyol Emulsions

Subsequently, aqueous emulsions are prepared from the polyol resins according to Examples 1–5 and Comparative Examples 6 and 7, respectively. The following method was applied in all seven cases. The amounts of the components used are listed in Table 4.

Into a 3 l glass reactor equipped with a stirrer, a nitrogen inlet, and a condenser an acrylic polymer solution according to any one of Examples 1–7 is charged and heated to 130° C. under a nitrogen flow of 10 l per hour. Then, under reduced pressure, about 25 wt. % of butylglycol is distilled off in order to obtain a concentrated resin solution. The content of the reactor is added gradually, over a period of 20 minutes, to a second reactor containing demineralized water and dimethanol amine pre-heated to 50–55° C. During the addition of the concentrated resin solution the temperature of the second reactor rises to about 60° C. A white aqueous emulsion is obtained which is stirred at 55–60° C. for a period of 60 minutes. Finally the emulsion is cooled to room temperature and filtered.

TABLE 4

Components of resin emulsions of Examples 1–7

| Example | 1 | 2 | 3 | 4 | 5 | 6 | 7 |
| --- | --- | --- | --- | --- | --- | --- | --- |
| Acrylic polymer solution | 42.5 | 44.0 | 42.0 | 42.0 | 29.4 | 42.0 | 42.0 |
| Demineralized water | 56.9 | 54.8 | 57.4 | 57.4 | 60.1 | 57.4 | 56.8 |
| Dimethanol amine | 0.6 | 1.2 | 0.6 | 0.6 | 0.5 | 0.6 | 1.2 |

The properties of the obtained aqueous emulsions are listed in the following Table 5. The viscosity of the emulsions was measured with a Brookfield® viscometer at 23° C. (rotor LVT2, speed 38) in accordance with ISO 2555–1974. The particle sizes of the emulsions were measured on a Malvern Instruments Autosizer® Lo-C Photon Correlation Spectrometer.

TABLE 5

Properties of resin emulsions

|  | Examples | | | | | Comp. Examples | |
| --- | --- | --- | --- | --- | --- | --- | --- |
| Example | 1 | 2 | 3 | 4 | 5 | 6 | 7 |
| Solids content after 1 hour at 125° C. | 40.1 | 39.4 | 39.8 | 39.8 | 26.3 | 40.2 | 39.9 |
| Viscosity (mPa · s at 23° C.) | 290 | 100 | 90 | 200 | 820 | 190 | 480 |
| Initial particle size (nm) | 102 | 98 | 92 | 100 | 24 | 116 | 87 |
| Particle size after 6 months (nm) | 116 | 99 | 98 | 135 | 46 | 138 | 160 |
| Initial acid nr. (mg KOH/g) | 16.9 | 19.5 | 15.6 | 16.3 | 15.6 | 10.9 | 17.9 |
| Acid nr. after 6 months | 18.9 | 22.1 | 17.2 | 21.0 | 18.2 | 11.0 | 21.2 |
| Initial pH | 7.9 | 8.8 | 8.3 | 8.3 | 8.7 | 7.7 | 8.7 |
| pH after 6 months | 7.3 | 8.0 | 7.8 | 7.6 | 8.0 | 6.6 | 7.8 |
| Sediment after 6 months | No | No | No | No | No | No | Yes |

Subsequently, coating compositions are made of each of the obtained emulsions. The coating compositions are made according to the following method.

The amounts of the components that were used are listed in the following Table 6. An anti-foaming agent (Dehydran® 1293), a wetting agent (Surfynol® 104), levelling agents (Byk® 301, Byk® 348), an acrylic thickener (Viscalex® HV30), and a dibutyl tin dilaurate (Tinstab® BL277) were added to the resin emulsions of the Examples 1–7. After each addition the mixture was stirred to homogenize it. Then solutions of the isocyanate cross-linkers in the used solvents (butylacetate and butylglycol acetate) were added to the emulsions with gentle stirring. Subsequently, the homogenized coating compositions were further diluted with demineralized water to spraying viscosity. Table 6—Components for coating compositions of Examples A–G

|  |  |  | Examples |  |  |  |  | Comp. examples |  |
|---|---|---|---|---|---|---|---|---|---|
| Components | (%) | Solvent | 1 | 2 | 3 | 4 | 5 | 6 | 7 |
| Resin emulsion |  |  | 50.0 | 52.3 | 53.9 | 46.6 | 41.0 | 54.0 | 49.1 |
| Dehydran ® 1293 |  | Butyl glycol | 0.2 | 0.2 | 0.2 | 0.1 | 0.1 | 0.17 | 0.2 |
| Surfynol ® 104 | 50 | Proglyde ® DMM | 1.0 | 1.0 | 1.0 | 0.9 | 0.8 | 1.0 | 0.9 |
| Byk ® 301 | 52 | Butyl glycol | 0.1 | 0.1 | 0.1 | 0.1 | 0.1 | 0.1 | 0.1 |
| Byk ® 348 | 100 |  | 0.1 | 0.1 | 0.1 | 0.1 | 0.1 | 0.1 | 0.1 |
| Viscalex ® HV30 | 10 | Water | 2.0 | 2.0 | 2.1 | 1.8 | 1.6 | 2.1 | 1.9 |
| Tinstab ® BL277 | 1 | Solvesso ® 100 | 0.4 | 0.4 | 0.3 | 0.4 | 0.2 | 0.4 | 0.4 |
| Bayhydur ® 3100 | 100 |  | 19.6 | 18.8 | 5.3 | 8.5 | 4.9 | 19.7 | 18.0 |
| Bayhydur ® 2150/1 | 70 | MPA: Xylene = 1:1 | 0 | 0 | 9.6 | 15.5 | 9.0 | 0 | 0 |
| Butyl acetate |  |  | 5.9 | 5.9 | 2.8 | 2.2 | 1.3 | 6.2 | 5.7 |
| Butyl glycol acetate |  |  | 2.0 | 2.0 | 0.9 | 0.7 | 0.4 | 2.1 | 1.9 |
| Demineralized water |  |  | 28.4 | 17.2 | 23.7 | 23.0 | 40.6 | 14.2 | 21.7 |

The obtained coating compositions show the properties listed in the following Table 7. Viscosity was determined with a DIN flow cup number 4 in accordance with DIN 53221–1987.

TABLE 7

|  | Examples |  |  |  |  | Comparative examples |  |
|---|---|---|---|---|---|---|---|
|  | 1 | 2 | 3 | 4 | 5 | 6 | 7 |
| Viscosity (Din 4 at 23° C.) | 27 | 28 | 29 | 30 | 28 | 31 | 29 |
| Solids content (weight %) (1 hour at 125° C.) | 37.9 | 49.1 | 45.4 | 51.5 | 38.5 | 49.5 | 49.7 |
| Volatile organic content | 200 | 200 | 200 | 195.6 | 200 | 200 | 200 |
| Demineralized water content (weight %) | 53.2 | 39.4 | 43.8 | 36.9 | 52.5 | 38.9 | 38.6 |
| Co-solvent (weight %) | 8.9 | 11.5 | 10.8 | 11.6 | 9.0 | 11.6 | 11.7 |
| NCO/OH ratio | 1.5 | 1.5 | 1.5 | 1.5 | 1.5 | 1.5 | 1.5 |

The coatings were applied by spraying onto phosphatized steel panels (type Bonder® 26S60 DC) and untreated steel panels precoated with a primer (Autosurfacer® 940) and a solvent-borne base coat (Autobase®). After drying, the thickness of the layer was about 40 microns. The panels were then cured at 23° C. and a relative humidity of 50% for seven days and subjected to various tests. The results are shown in the following Table 8. Unless stated otherwise, the results relate to the panels that were precoated with primer and base coat.

In Table 8, the potlife is the time between the initial mixing of all components and the point where the viscosity has doubled. The hardness is measured in Persoz seconds in accordance with ISO 1522. The gloss is measured in accordance with ISO 2813:1994 at an angle of 20° and expressed in GU.

The Enamel Hold Out (EHO) is determined as the total visual appearance taking into account gloss, smoothness, wrinkling, and distinctness of image. The samples are rated on a scale from 1 (excellent appearance) to 5 (very poor appearance).

The foam and pinhole limit indicates, in microns, the maximum allowable dry layer thickness of the aqueous coatings without the occurrence of gas bubbles or pinholes. For this purpose the coatings were sprayed onto Bonder® 26S60 OC panels with a dry layer thickness gradually increasing over the length of the panel to about 150 microns.

The acid resistance is measured by leaving a drop of 30% sulfuric acid on the dried film for 16 hours at 23° C., after which the panel is wiped and dried. After one hour the panel is inspected for softening or other damage. Rating is on a scale of 1 (=no effect) to 5 (=completely destroyed).

Xylene resistance is measured by leaving a piece of xylene-soaked cottonwool on the dried film for 5 minutes, after which the panel is wiped. The panel is then inspected for softening or other damage. Rating is on a scale of 1 (=no effect) to 5 (=completely dissolved).

TABLE 8

|  | Example 1 | Example 2 | Example 3 | Example 4 | Example 5 | Comp. Ex. 6 | Comp. Ex. 7 |
|---|---|---|---|---|---|---|---|
| Potlife (hours at 23° C.) | >6 | >6 | >6 | 5 | >6 | >6 | 2 |

TABLE 8-continued

|  | Example 1 | Example 2 | Example 3 | Example 4 | Example 5 | Comp. Ex. 6 | Comp. Ex. 7 |
|---|---|---|---|---|---|---|---|
| Hardness on steel (Persoz seconds) | | | | | | | |
| After 1 day | 61 | 95 | 57 | 125 | 163 | 15 | 62 |
| After 7 days | 114 | 134 | 142 | 251 | 270 | 91 | 95 |
| Hardness on basecoat (Persoz seconds) | | | | | | | |
| After 1 day | 52 | 91 | 56 | 108 | 86 | 15 | 70 |
| After 7 days | 104 | 131 | 126 | 156 | 149 | 100 | 92 |
| Gloss 20°, (GU) | 86 | 81 | 85 | 85 | 86 | 81 | 82 |
| Enamel Hold Out | 1 | 1 | 1 | 1 | 2 | 1 | 5 |
| Foam and pinhole limit (microns) | >125 | >125 | >125 | >125 | >125 | >125 | 75 |
| Xylene resistance | 1 | 1 | 2 | 1 | 1 | 2 | 1 |
| Acid resistance | 1 | 1 | 1 | 2 | 1 | 1 | 1 |

What is claimed is:

1. An aqueous coating composition comprising:
   a) a polyol or a mixture of polyols having at least two hydroxy groups per molecule and:
      i a content C of carboxylate- and/or carboxylic acid-functional groups and
      ii a content S of sulfonate- and/or sulfonic acid-functional groups,
   the total content C+S being between 0.09 and 0.6 mmol/gram of polyol, and the ratio C/S having a value between 0.5 to 20; and
   b) one or more cross-linkers capable of reacting with hydroxy groups.

2. The composition according to claim 1, wherein the ratio C/S is between 1 to 5.

3. The composition according to claim 1, wherein the ratio C/S is between 1.5 and 3.

4. The composition according to claim 1, wherein the total acid content of the sulfonate and/or sulfonic acid and carboxylate and/or carboxylic acid groups is between 0.18 and 0.36 mmol/gram polyol.

5. The composition according to claim 1, wherein at least a portion of the polyols in the composition are polyols comprising both carboxylate- and/or carboxylic acid-functional groups and sulfonate- and/or sulfonic acid-functional groups.

6. The composition according to claim 1, wherein the composition comprises an emulsion or dispersion of a mixture of polyols comprising carboxylate- and/or carboxylic acid-functional groups and polyols comprising sulfonate- and/or sulfonic acid-functional groups.

7. The composition according to claim 1, wherein the composition comprises a mixture of a first emulsion or dispersion of polyols with carboxylate- and/or carboxylic acid-functional groups, and a second emulsion or dispersion of polyols with sulfonate- and/or sulfonic acid-functional groups.

8. The composition according to claim 1, wherein the cross-linker is a polyisocyanate or a mixture of polyisocyanates.

9. The composition according to claim 1, wherein the cross-linker is a polyisocyanate or a mixture of polyisocyanates having hydrophilic groups.

10. The composition according to claim 1, wherein the polyols are polyacrylates, polyesters, polyethers, polyurethanes, polyester urethanes, acrylated hybrides thereof and/or mixtures thereof.

11. The composition according to claim 1, wherein more than 50% of the sulfonic acid groups and the carboxylic acid groups are neutralized with amines.

12. The composition according to claim 1, wherein more than 50% of the sulfonic acid groups and the carboxylic acid groups are neutralized with tertiary amines.

13. A clear or pigmented top coat or a primer comprising the composition of claim 1.

14. A polyol having a content C of carboxylate- and/or carboxylic acid-functional groups and a content S of sulfonate- and/or sulfonic acid-functional groups, the total content C+S of the sulfonate and/or sulfonic acid and carboxylate and/or carboxylic acid groups being between 0.09 and 0.6 mmol/gram polyol, and the ratio C/S having a value between 0.5 and 20.

15. A process for preparing the polyol of claim 14, the process comprising the following steps:
   polymerizing a mixture of hydroxy-functional, olefinically unsaturated monomers without carboxylic acid- or sulfonic acid-functional groups and without carboxylate- or sulfonate-functional groups in a solvent-borne solution to obtain a hydrophobic polyol;
   adding to the mixture, after a portion of the monomer mixture has polymerized, a mixture of said monomers with olefinically unsaturated monomers having hydroxy groups, carboxylic acid and/or carboxylate groups and/or sulfonic acid and/or sulfonate groups to obtain a hydrophilic polyol;
   evaporating the solvent by raising the temperature; and
   dispersing the polyol in a mixture of water and amines.

16. A process for preparing a polyol resin, the process comprising the following steps:
   polymerizing a mixture of hydroxy-functional, olefinically unsaturated monomers without carboxylic acid- or sulfonic acid-functional groups and without carboxylate- or sulfonate-functional groups in a solvent-borne solution to obtain a hydrophobic polyol;
   adding to the mixture, after a portion of the monomer mixture has polymerized, a mixture of said monomers with olefinically unsaturated monomers having hydroxy groups, carboxylic acid and/or carboxylate groups and/or sulfonic acid and/or sulfonate groups to obtain a hydrophilic polyol;

evaporating the solvent by raising the temperature; and dispersing the polyol in a mixture of water and amines.

17. The process according to claim 16, wherein the monomers having carboxylic acid-functional and/or carboxylate-functional monomers and/or sulfonic acid-functional or sulfonate-functional groups, are added after about 50–90 wt. % of the monomers without carboxylic acid- or sulfonic acid-functional or carboxylate or sulfonate groups have been polymerized.

18. The process according to claim 16, wherein the monomers having carboxylic acid-functional and/or carboxylate-functional monomers and/or sulfonic acid-functional or sulfonate-functional groups, are added after about 60–80 wt. % of the monomers without carboxylic acid- or sulfonic acid-functional or carboxylate or sulfonate groups have been polymerized.

\* \* \* \* \*